United States Patent Office 3,763,298
Patented Oct. 2, 1973

3,763,298
BONDING OF POLYETHYLENE TO
METAL SURFACES
Lewis Godfrey Sharman and Richard Morris, Surbiton, England, assignors to Graseby Instruments Limited, Surbiton, Surrey, England
No Drawing. Filed May 13, 1971, Ser. No. 143,270
Claims priority, application Great Britain, May 13, 1970, 23,093/70
Int. Cl. B32b 7/00
U.S. Cl. 264—135     11 Claims

ABSTRACT OF THE DISCLOSURE

To bond polyethylene to a surface of a metal article, the article (if not of lead) is plated with lead and oxidised to form a lead peroxide coating; a first coating of polyethylene is then injection moulded onto the lead peroxide coated surface and the article is baked at a temperature of 440° to 490° C. for 2–3 hours to bond the polyethylene to the coated surface. The hardened skin of oxide which is formed due to the baking, is removed from the polyethylene coating and then a second polyethylene coating is injection moulded onto the article.

BACKGROUND OF THE INVENTION (1) Field of the invention

This invention relates to the bonding of solid polymers of ethylene, hereinafter called polyethylene, to metal surfaces.

(2) Prior art

Although it is often required to bond polyethylene to metal surfaces, it has long been known that it is difficult to obtain a strong and close bond. Problems therefore arise, for example, when the polyethylene is used as an insulator in high voltage applications as small voids between the metal and the polyethylene result in discharges which cause local degradation of the material and thereby lead to breakdowns of the insulation. A particular problem arises in undersea cables where the bonding of polyethylene insulating material to metal members, as is required for example in sealing repeaters, has to be extremely close in order to prevent any possibility of water entering under the very high hydrostatic pressures. Heretofore, in attempting to get very close bonding of polyethylene to metal surfaces, it has been the practice, after cleaning the metal, to coat the metal with a solution of polyethylene in xylene and to precipitate the polyethylene from the solution either by evaporation of the solvent or by cooling the solvent below the temperature of precipitation. The polyethylene is then bonded to the metal surface by heating. However, with this technique, it is only possible to obtain quite a thin coating of polyethylene and problems arise in trying to apply further polyethylene on top of this thin coating, as for example by injection moulding, since the thin coating is oxidised by the previous heating which is necessary to bind it to the metal and therefore cannot flow to unite intimately with the further material applied to it.

SUMMARY OF THE INVENTION

It is an object of the present invention to provide an improved method of bonding polyethylene to metal articles.

According to the present invention, a process for the bonding of polyethylene to a metal article consists in plating the surface of the metal with lead, oxidising the lead to form lead peroxide, injection moulding a first coating of polyethylene onto the lead peroxide, baking the coated metal article to bond the polyethylene to the lead peroxide coated metal, removing the hardened skin of oxide from the polyethylene coating and then injection moulding a further coating of polyethylene onto the first coating. If the metal article is lead, it is not necessary to plate the article wth lead before oxidising the lead surface to form lead peroxide and thus invention includes within its scope a process for bonding polyethylene to a lead article comprising the steps of oxidising the surfaces of the article to form lead peroxide, injection moulding a first coating of polyethylene onto the lead peroxide, baking the coated lead article to bond the polyethylene to the coated surface, removing the hardened skin of oxide from the polyethylene coating and then injection moulding a further coating of polyethylene onto the first coating.

The first coating of polyethylene adheres to the lead peroxide and, to effect the bonding, the article at this stage may be baked at a temperature of between 440° C. and 490° C. for 2 to 3 hours. This heat treatment bonds the polyethylene coating to lead peroxide but oxidises the surface of the polyethylene. In the process described above, the hardened oxidised outer skin on the polyethylene is then removed, conveniently by machining. Such machining is not possible with the thin layers produced by coating with a solution of polyethylene as has been done heretofore. When the hardened outer skin has been removed, unoxidised polyethylene is exposed and surface flow can take place when the next layer of polyethylene is injection moulded. Because of the bonding to the lead peroxide however, the whole of the first coating will not flow away from the coated metal surface. Thus the second coating of polyethylene becomes in effect integral with the first coating.

The heating of the coated metal after applying the first coating of polyethylene as indicated above is preferably at a temperature of 440 to 490° C. Preferably, to effect this heat treatment, the coated component is encased in metal foil and heated in an oven; the metal foil holds the polyethylene in position on the metal and prevents flow of the polyethylene away from the metal surface.

Preferably the first coating of polyethylene is at least 0.25 inch thick. The subsequent machining after baking is preferably such as to leave at least 0.1 inch of polyethylene over the whole surface of the metal.

It has been found preferable, before injection moulding the second coating of polyethylene, to preheat the article to a temperature in the range of 50 to 60° C.; this provides retardation of the flow which might occur if the article were at a lower temperature.

DESCRIPTION OF THE PREFERRED EMBODIMENT

The following is a description of one example of bonding polyethylene to a metal. This particular example relates to the bonding of a polyethylene seal to an aluminum bronze cable gland for sealing a repeater of a deep-sea telephone cable. The polyethylene-metal bond has to prevent any ingress of water into the equipment and, if the equipment is operated within a pressurised gas, to prevent the egress of the pressurising gas.

The following is a description of one example of bonding polyethylene to a metal. This particular example relates to the bonding of a polyethylene seal to an aluminum bronze cable gland for sealing a repeater of a deep-sea telephone cable. The polyethylene-metal bond has to prevent any ingress of water into the equipment and, if the equipment is operated within a pressurised gas, to prevent the egress of the pressurising gas.

The aluminium bronze cable gland is initially degreased and electrolytically cleaned. That part of the cleaned surface of the gland on which the polyethylene is to be bonded is lead plated to a thickness of 0.002" in a plating bath. It has been found that, although a lead plate thicker than 0.002" may be employed, no further advantage is obtained with a thicker layer; on the other hand a thinner layer may result in a poorer bond.

The lead-plated portion of the gland is then anodised to oxidise the surface of the lead to lead peroxide. When lead is oxidised it goes through a series of colour changes and it has been found that the first coating of polyethylene adheres best to lead which has been oxidised to a chocolate brown colour corresponding to the formation of lead perioxide.

The lead-plated cable gland is then mounted within a suitable mould of an injection moulding machine, preheated to 50° C. and then molten polyethylene is injected onto the lead peroxide coating at the pressure of 500 p.s.i. It is preferred to use a high density polyethylene and in this particular example, the polyethylene employed was a high density polyethylene of the kind known as XDK 69 supplied by I.C.I. The mould is dimensioned to give a coating of polyethylene which is at least 0.25 inch thick over the lead peroxide. After the injection moulding operation has been completed, the metal article with the polyethylene coating is allowed to cool gradually to minimise thermal stresses which would tend to cause the coating to separate from the metal.

The coated article is then encased in a sheet of metal foil and baked in an oven at a temperature of 470° C. for 2½ hours. The metal foil holds the polyethylene in position on the metal and prevents flow of polyethylene away from the metal surfaces. The effect of the baking is to cause the polyethylene coating to bond effectively to the lead peroxide, but also causes the polyethylene to be oxidised on its outer surface forming a hard skin. After the baking has been completed, the article is allowed to cool and the hard oxidised skin is machined away, leaving a coating of polyethylene approximately 0.1 inch thick.

In this particular example, the machined component at this stage is then fitted onto a cable sheathed in polyethylene of the same grade as that used in the injection moulding process and a small amount of polyethylene is injected onto the metal gland to hold the cable in position therein.

The component is now ready for the second injection moulding operation. The whole component is mounted within a further mould shaped to conform to the required external form of the polyethylene on the gland. After preheating the article to a temperature of 50° C., the polyethylene is injected in molten form onto the machined surface of the first coat at a pressure of 800 p.s.i. The polyethylene injected at this stage is the same grade of material as employed for the first injection moulding. The first coating, after the machining is still sufficiently thick to enable surface flow to take place when the next layer of polyethylene is injection moulded but is not so thin that the whole of the first coating might flow away from the metal surface. The second coating therefore unites intimately with the first coating which is itself securely bonded to the metal.

The above described process may be applied to any metal which is capable of receiving a coating of lead plating. It may be applied to lead articles; in this case, the lead itself may be oxidised to form lead peroxide without the intermediate step of lead plating.

We claim:

1. A method of bonding polyethylene to a metal article comprising the steps of plating the surface of the metal with lead, oxidising the lead to form lead peroxide, injection moulding a first coating of polyethylene onto said lead peroxide and into direct contact with the latter in the absence of an intermediate bonding agent disposed between said first coating of polyethylene and said lead peroxide, baking the lead oxide coated metal to bond the polyethylene to the coated metal at a temperature of between 440° C. and 490° C., removing the hardened oxidised skin from the first coating of polyethylene and then injection moulding a further coating of polyethylene onto the first coating.

2. A method of bonding polyethylene to a lead article comprising the steps of oxidising the lead to form lead peroxide, injection moulding a first coating of polyethylene onto the lead peroxide and into direct contact with the latter in the absence of an intermediate bonding agent disposed between said first coating of polyethylene and said lead peroxide, baking the coated article at a temperature of between 440° C. and 490° C., removing the hardened oxidised skin from polyethyelne coating and injection moulding a further coating of polyethylene onto the first coating.

3. A method according to claim 1 wherein the lead plating has a thickness of at least 0.002 inch.

4. A method as claimed in claim 1 wherein the lead is oxidised by anodising it.

5. A method as claimed in claim 1 wherein the lead oxide coated article is heated to a temperature in the range of 50° to 60° C. before injection moulding the first coating of polyethylene onto lead peroxide.

6. A method as claimed in claim 1 wherein the first coating of polyethylene has a thickness of at least 0.25" over the lead peroxide.

7. A method as claimed in claim 1 wherein the baking of the metal article with the first coating of polyethylene is effected at a temperature of between 440° C. and 490° C. for between 2 and 3 hours.

8. A method as claimed in claim 1 wherein the hardened oxidised skin is removed from the first polyethylene coating by machining.

9. A method as claimed in claim 1 wherein, before injection moulding said further coating of polyethylene onto the first coating, the article is heated to a temperature in the range of 50 to 60° C.

10. A method as claimed in claim 1 wherein, before baking the article with the polyethylene, the article with its coating is encased in metal foil.

11. A method of bonding polyethylene to a metal article comprising the steps of plating at least part of the surface of the metal with lead to a thickness of at least 0.002 inch, oxidizing the lead to form lead peroxide, heating the article to a temperature in the range of 50°–60° C., injection moulding a first polyethylene coating directly onto the lead peroxide and into direct contact with the latter in the absence of an intermediate bonding agent disposed between said first coating of polyethylene and said lead peroxide, said coating with a thickness of at least 0.25 inch, encasing the article in metal foil, baking the coated article in its casing at a temperature of between 440° C. and 490° C. for between 2 and 3 hours, removing the metal foil, removing the hardened oxidized skin from the first coating, heating the article to a temperature in the range 50°–60° C., and injection moulding a second coating of polyethylene onto the first coating.

References Cited

UNITED STATES PATENTS

| 3,630,792 | 12/1971 | Smyth et al. | 148—6.3 |
|---|---|---|---|
| 3,585,103 | 6/1971 | Thompson | 117—75 |
| 3,540,203 | 11/1970 | Thoresen et al. | 264—174 |
| 2,321,889 | 6/1943 | Bailey et al. | 117—75 |

FOREIGN PATENTS

| 561,041 | 7/1958 | Canada | 117—75 |

ROBERT F. WHITE, Primary Examiner

T. E. BALHOFF, Assistant Examiner

U.S. Cl. X.R.

117—71, 75; 148—6.14; 264—265